(12) United States Patent
Rosales

(10) Patent No.: US 10,793,090 B2
(45) Date of Patent: Oct. 6, 2020

(54) VEHICLE CABLE FASTENER

(71) Applicant: Brose Schließsysteme GmbH & Co. Kommanditgesellschaft, Wuppertal, Wuppertal (DE)

(72) Inventor: David Rosales, Rochester Hills, MI (US)

(73) Assignee: Brose Schließsysteme GmbH & Co. KG, Wuppertal, Wuppertal (DE)

( * ) Notice: Subject to any disclaimer, the term of this patent is extended or adjusted under 35 U.S.C. 154(b) by 0 days.

(21) Appl. No.: 16/128,002

(22) Filed: Sep. 11, 2018

(65) Prior Publication Data
US 2020/0079300 A1 Mar. 12, 2020

(51) Int. Cl.
*H02G 3/32* (2006.01)
*B60R 16/02* (2006.01)

(52) U.S. Cl.
CPC .......... *B60R 16/0215* (2013.01); *H02G 3/32* (2013.01)

(58) Field of Classification Search
CPC .......................... H01R 13/6395; H01R 25/006
USPC ................... 248/63, 65, 71, 74.1, 74.2, 74.3
See application file for complete search history.

(56) References Cited

U.S. PATENT DOCUMENTS

| | | | | |
|---|---|---|---|---|
| 7,628,447 | B2* | 12/2009 | Sugimoto | B60R 13/02 248/49 |
| 9,146,003 | B2* | 9/2015 | Carson | F16M 13/02 |
| 2002/0000498 | A1* | 1/2002 | Workman | F16L 3/24 248/62 |
| 2012/0318935 | A1* | 12/2012 | Benedetti | F16L 3/1075 248/74.1 |
| 2013/0313375 | A1* | 11/2013 | Dworak, Jr. | F16L 3/1075 248/74.2 |
| 2015/0122957 | A1* | 5/2015 | Michiels | F16L 3/1075 248/74.2 |

* cited by examiner

*Primary Examiner* — Steven M Marsh
(74) *Attorney, Agent, or Firm* — Brooks Kushman, P.C.

(57) ABSTRACT

A fastener for a vehicle actuation cable is provided. The fastener may include a body, a first foot, and a leg. The body may define an aperture that is sized to receive the vehicle actuation cable. The first foot may extend from the body and include a locking surface configured to engage a surface adjacent to an attachment aperture. The leg may outwardly extend from the body and a portion of the leg may be curved around a portion of an outer periphery of the body so that a distal portion of the leg is biased away from the body.

18 Claims, 3 Drawing Sheets

VEHICLE CABLE FASTENER

TECHNICAL FIELD

The present disclosure relates to a fastener for fixing a vehicle actuation cable to a vehicle panel.

BACKGROUND

Vehicle doors, windows, hatches panels, and the like are often secured or moved by one or more mechanical or electro-mechanical mechanisms. These mechanical or electro-mechanical mechanisms may be actuated by one or more cables stretching between the mechanism to an actuator within the vehicle. These cables may be secured or fastened to one or more vehicle body panels or other structural members.

SUMMARY

One general aspect includes a fastener for a vehicle actuation cable including: a body defining an aperture that is sized to receive an actuation cable. The fastener also includes a first foot extending from the body where the first foot includes a locking surface configured to engage a surface adjacent to an attachment aperture. The fastener also includes a leg outwardly extending from the body, where a portion of the leg is curved around a portion of an outer periphery of the body so that a distal portion of the leg is biased away from the body.

Implementations may include one or more of the following features. The fastener further including a cable engaging member, where the cable engaging member is an elongated tube that extends from the body along a center axis defined by the aperture. The fastener where the cable engaging member and the body are integrally formed to one another. The fastener where the body includes an upper portion that defines an outer periphery, and where the outer periphery of the upper portion is spaced apart from the curved portion of the leg. The fastener where the distal portion of the leg is straight. The fastener where the leg terminates at a second foot and where the second foot defines a locking surface configured to engage a surface adjacent to the attachment aperture. The fastener where a portion of the body and a portion of the leg defines a relief notch. The fastener where the first foot and the second foot are arranged so that they extend away from one another. The fastener where the second foot defines a chamfer configured to facilitate insertion of the second foot into the attachment aperture.

One general aspect includes a clip configured to receive a vehicle actuation cable for fixing the vehicle actuation cable to a vehicle panel, the clip including: a body defining an aperture that is sized to receive an actuation cable. The clip also includes a first leg extending from the body including a portion configured to engage a periphery of a connection aperture. The clip also includes a second leg outwardly extending from the body, where a portion of the leg is curved around a portion of an outer periphery of the body so that a distal portion of the leg is biased away from the body.

One general aspect includes a fastener for a vehicle actuation cable including: a body provided with an engagement wall and defining an aperture that is sized to receive an actuation cable. The fastener also includes a first foot extending from the body where the first foot includes a locking surface configured to engage a surface adjacent to an attachment aperture. The fastener also includes a leg outwardly extending from the body, where a portion of the leg is curved around a portion of an outer periphery of the body so that a distal portion of the leg is biased away from the body and where the engagement wall is configured to engage the distal portion of the leg when the body is rotated towards the distal portion.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Clips or fasteners may be used to attach or fix one or more cables to a vehicle panel or other vehicle member. The fasteners may include an elongated tube, configured to engage a cable, and one or more legs that extend downwardly from the body that may be each inserted into one or more apertures defined by the vehicle panel. The legs may be configured so that sliding the fastener positively engages the aperture.

Figure 1:
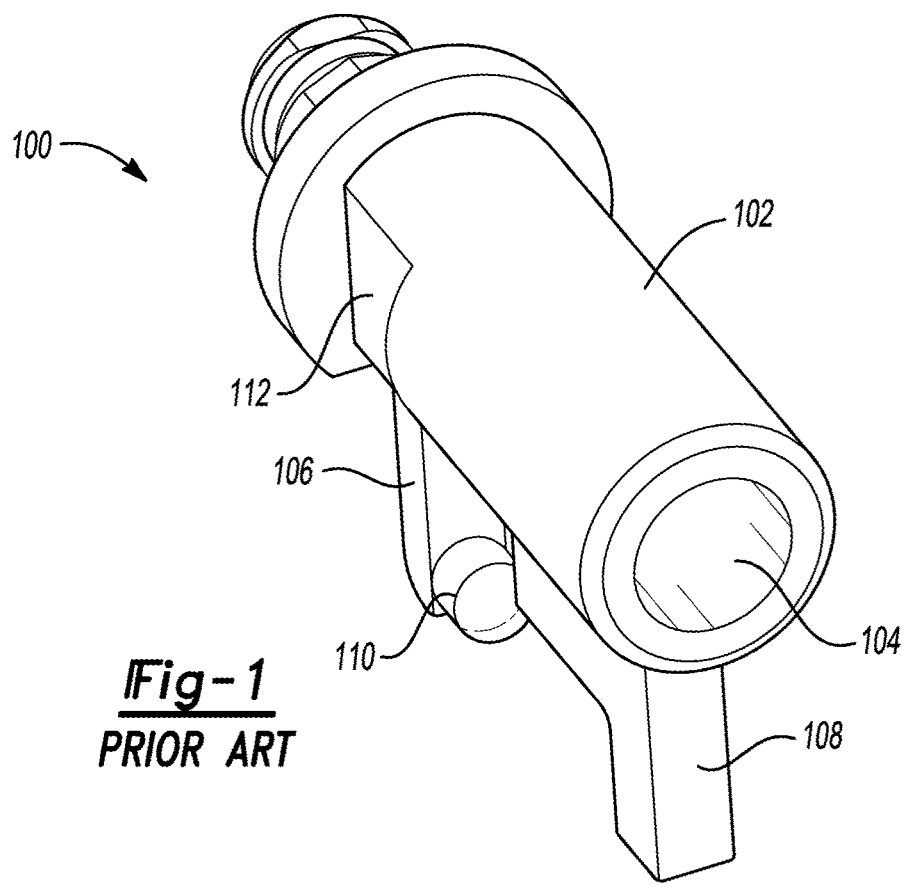
FIG. 1 is a perspective view of an exemplary prior-art fastener for use with a vehicle cable.

Referring to FIG. 1, a prior-art fastener 100 is illustrated. The fastener 100 may include a tube portion 102 that may define an inner periphery 104 that is sized to receive cable. A first leg 106 and a second leg 108 may extend from the tube portion 102. The first leg 106 may include a spherical ball 110 sized to engage a notch defined by a panel or a protrusion that extends from the panel. To fix the prior-art fastener 100 to the panel, a narrowed portion 112, defined by the tube portion 102, may be inserted between a pair of opposing surfaces defined by the panel. After the narrowed portion 112 is engaged with a portion of the panel, the tube portion 102, first leg 106, and second leg 108 may be rotated so that the first leg 106 and the second leg 108 each engage a locking surface defined by the panel. The spherical ball 110 may also engage another locking surface that is also defined by the panel.

The prior-art fastener 100 may be associated with one or more challenges. For example, the first and second legs 106 108 may have a relatively small cross-sectional area as compared to the thickness of the walls defined by the tube portion 102, so that the legs may bend or deflect when moved from an uninstalled (e.g., disengaged) to an installed (e.g., engaged) position. The smaller cross-sectional area may be difficult to mold the first and second legs 106 108. Moreover, because the first leg 106 and second leg 108 have an elongated shape that extends away from the tube portion 102, providing the liquid plastic to the distal ends of the legs may create pores within the plastic molded part. The presence of pores within the plastic molding may decrease the relative strength of the first leg 106 and second leg 108.

As another example, the height of the prior-art fastener 100 in the installed position may not be adjustable. Because the first leg 106 and second leg 108 are engaged by rotating the legs and the tube portion, relative movement of the inner periphery with respect to the panel may not be possible.

Figure 2:
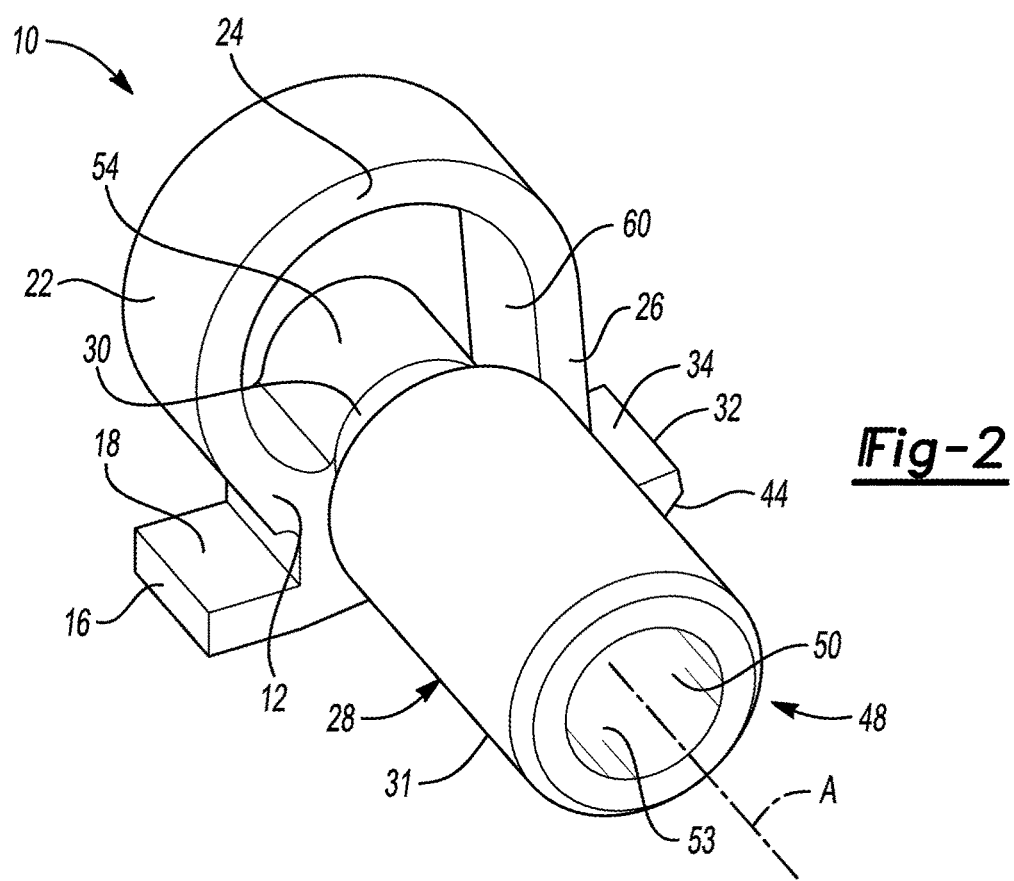
FIG. 2 is a perspective view of an exemplary fastener.

FIGS. 2 and 3 illustrate a fastener 10, such as a clip, for a vehicle actuation cable. The fastener 10 may include a body 12 that defines an aperture 14. The aperture 14 may be sized to receive a cable (e.g., Bowden cable, electrical cable, actuation cable). The fastener 10 may include a first foot 16 that outwardly extends from the body. The first foot 16 may include a locking surface 18 that may engage a surface 71 that is adjacent to an attachment aperture 20 defined by a vehicle panel 15. The fastener 10 may also include a leg 22 that outwardly extends from the body 12. A portion 24 of the leg 22 may be curved so that a distal portion 26 is biased away from the body 12. The distal portion 26 may be straight and extend from the curved portion 24.

The fastener 10 may also include a cable engagement member 28 that outwardly extends from the body 12. In one or more embodiments, the cable engagement member 28 may be an elongated tube that is arranged colinearly with the aperture 14. The cable engagement member 28 may include an intermediate portion 30 that is tapered between a cable engagement portion 31 and the body 12. In one or more embodiments, the cable engagement member 28 is integrally formed with the body. In other words, the cable engagement member 28, first foot, leg, and body are one piece that may be formed by injection molding.

The distal portion 26 of the leg may terminate at a second foot 32. The second foot 32 may define a locking surface 34 that is configured to engage a bottom surface 73 that is adjacent to the attachment aperture 20. In one or more embodiments, the first foot 16 and the second foot 32 may extend away from one another. The second foot 32 may include a chamfer 44 that may facilitate insertion of the second foot 32 into the attachment aperture 20.

A relief notch 38 may be provided between the leg 22 and the body 12. In one or more embodiments, the relief notch 38 may facilitate positioning of the leg 22 with respect to the body 12. Also, a surface 40 defined by the relief notch 38 may engage a top surface 42 (FIG. 2D) of the panel 15 to act as a stop to set a minimum height Hi or distance between an axis A and the top surface 42.

Referring specifically to FIG. 2, a perspective view of the cable fastener 10 is illustrated. The fastener 10 may include an affixing portion 13 that may include the first foot 16, leg 22, body 12, and second foot 32. In one or more embodiments, the affixing portion 13 engages the panel 15, such as a vehicle panel (e.g., door panel, seat rail, seat cushion, seat back frame).

The cable engagement member 28 may include a first end such as an insertion end 48 that defines a cable aperture 50.

The engagement member 28 includes an inner periphery 53 that define an inner diameter Di that is sized to receive a cable. The cable may include an outer sheath or cover that may circumferentially surround a wire. The wire may be actuated or moved relative to the cover and the fastener 10. In one or more embodiments, the engagement member 28 may be deformed e.g., crimped to couple the cable to the fastener 10. Alternatively, the cable engagement member 28 may be over molded to surround the cable.

The body 12 of the fastener 10 may include a first wall 52 that extends between the first foot 16 and the leg 22. The first wall 52 may extend upwardly from the first foot in a direction that is orthogonal (e.g., perpendicular) to the locking surface 18 of the first foot 16. In one or more embodiments the first wall 52 may be a leg that extends from the body 12. A top surface 54 of the body 12 may extend from the first wall 52. The top surface 54 may be arched or curved between the first wall 52 to a second wall 56. In one or more embodiments, the second wall 56 may be referred to as an engagement wall or locking wall. The second wall 56 may engage the distal portion 26 of the leg 22 to secure the fastener 10 to the attachment aperture 20.

In one or more embodiments the body 12, second leg 22, and cable engagement member 28 may each be comprised of a plastic or polymeric material. "Plastic" may refer to a polymeric material consisting of a wide range of synthetic or semi-synthetic organic compounds that are malleable and capable of being molded into solid objects.

In one or more embodiments, one or more components of the fastener 10 may be formed by an injection molding process. "Injection molding" may refer to a process in which plastic powder or plastic granules are fed from a hopper into a tube wherein a threaded feed screw is installed. The tube is heated and when a specific softening temperature is reached the feed screw pushes the softened plastic melt through the heated tube into a mold where the plastic material cools into the desired shape.

The actuation cable may be positioned in the mold prior to injecting the plastic. After injection, the feed screw may be reciprocated and a new charge of plastic pellets enters the tube. Instead of a reciprocating screw a ram injector can be used. After cooling the mold is opened and the injection molded part (e.g., fastener 10 or fastener 10 surrounding the cable) is removed.

As another example, the fastener 10 may be produced by an additive manufacturing process (e.g., three-dimensional printing).

Figure 3A:
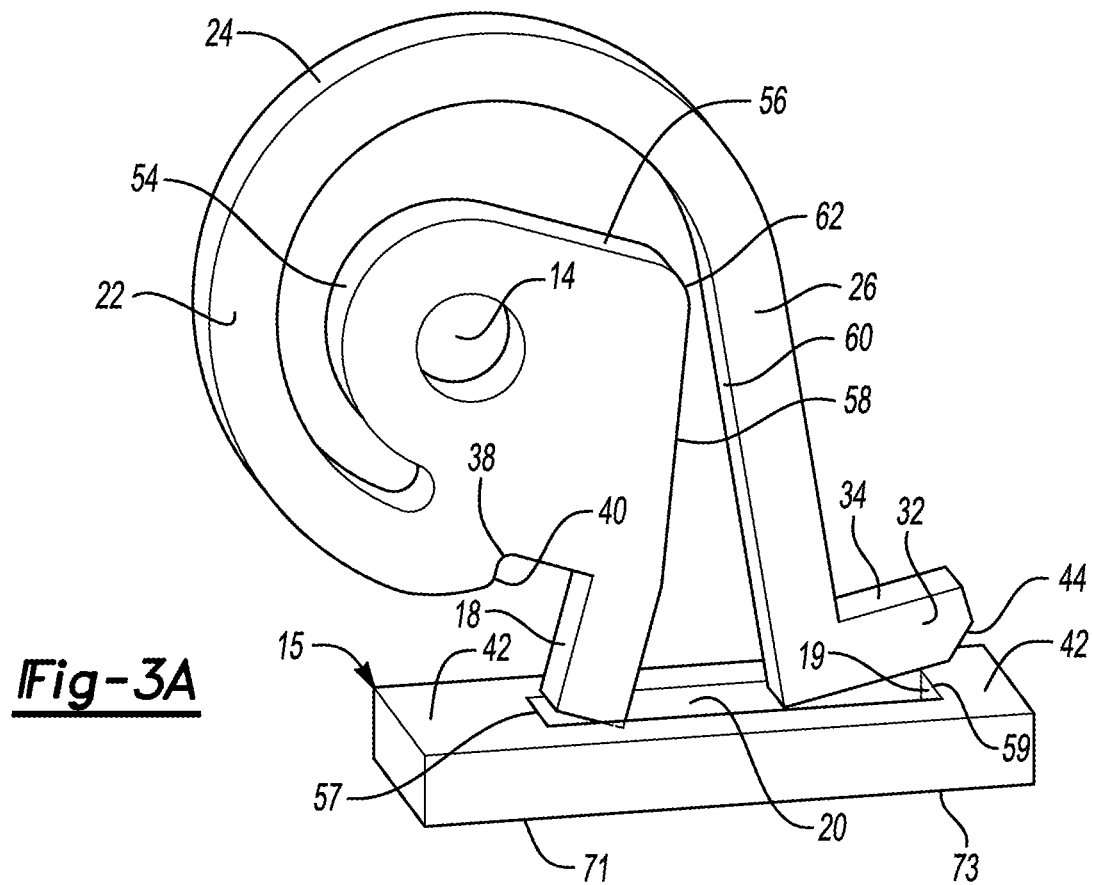
FIG. 3A is a perspective view of the exemplary fastener disposed above a vehicle panel.

FIGS. 3A through 3D illustrate one or more steps of inserting and securing the fastener 10 to the attachment aperture 20. For clarity the cable engagement member 28 is hidden in FIGS. 3A-3D. In FIG. 3A, the fastener 10 is positioned above the attachment aperture 20. The body 12 of the fastener 10 may include a bottom wall or surface 58 that is positioned adjacent to an inner surface 60 defined by the distal portion 24 of the leg 22. A radius 62 may be provided between the bottom surface 58 and the second wall 56.

Figure 3B:
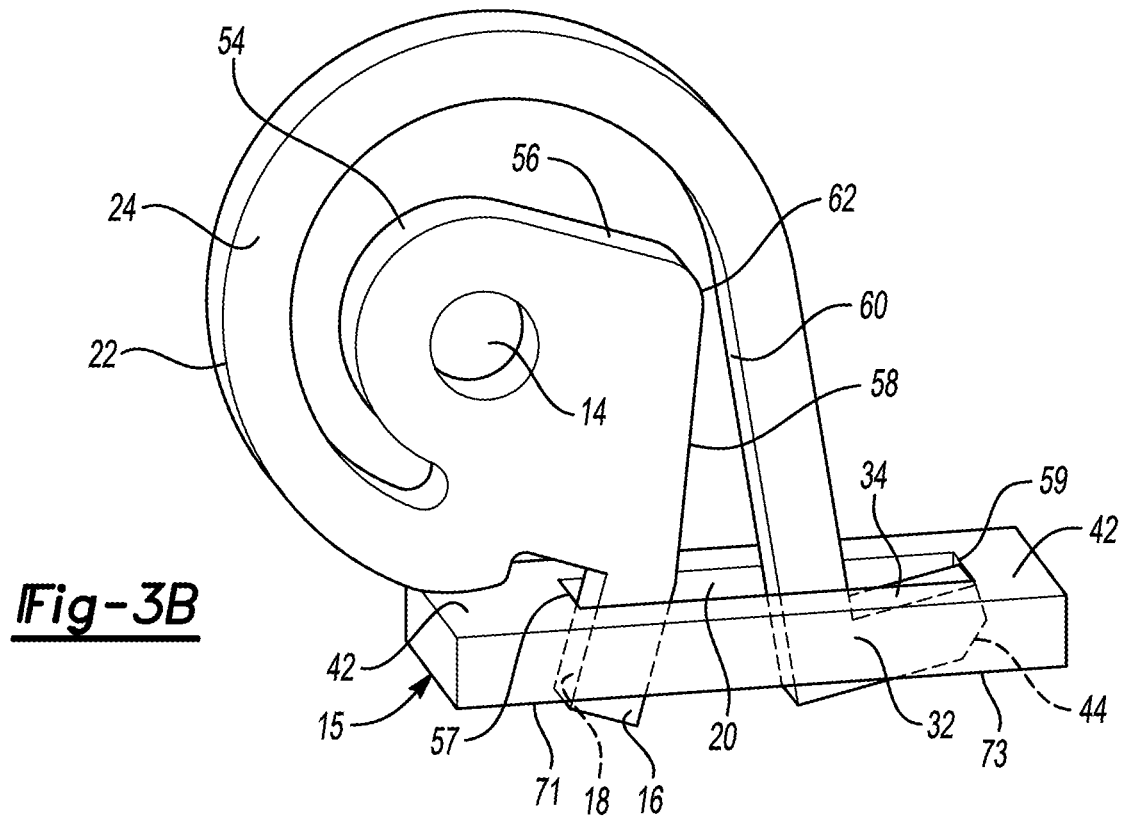
FIG. 3B is a perspective view of the exemplary fastener being installed to the vehicle panel.

In FIG. 3B, the first foot 16 and the second foot 32 are each partially disposed within the attachment aperture 20. The locking surface 18 of the first foot 16 may contact a first edge 57 of the attachment aperture 20. The leg 22 and second foot 32 may be moved towards the body 12 and partially inserted within the attachment aperture 20. The chamfer 44 provided on the second foot 32 may facilitate movement of the second foot 32 over a second edge 59 defined by the attachment aperture 20.

Figure 3C:
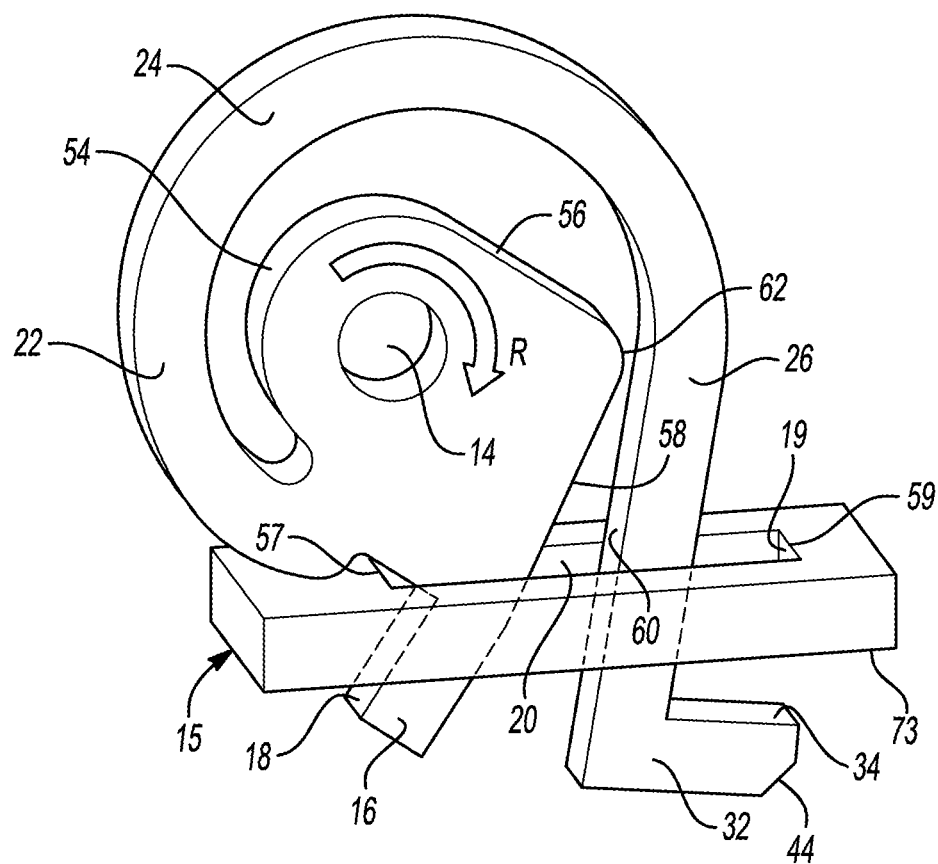
FIG. 3C is a perspective view of the exemplary fastener being installed to the vehicle panel.

In FIG. 3C, the first foot 16 is disposed within the attachment aperture 20 so that the first wall 52 contacts the first edge 57 of the attachment aperture 20. The second leg 22 may be disposed within the connection aperture 20 and the second foot 32 may be disposed below a bottom surface 73 of the panel. The second leg 22 may be spaced apart from the second edge 59 of the attachment aperture. In one or more embodiments, a portion of the leg 22 may contact the surface 19 that is adjacent to the attachment aperture 20. The body 12 of the fastener 10 may be rotated in a first rotational direction R so the radius 62 moves along the inner surface 60 of the second leg 22. As the body 12 rotates, the second wall 56 may engage the inner surface 60 of the second leg 22 to bias the second leg 22 towards the second edge 59 of the attachment aperture 20.

Figure 3D:
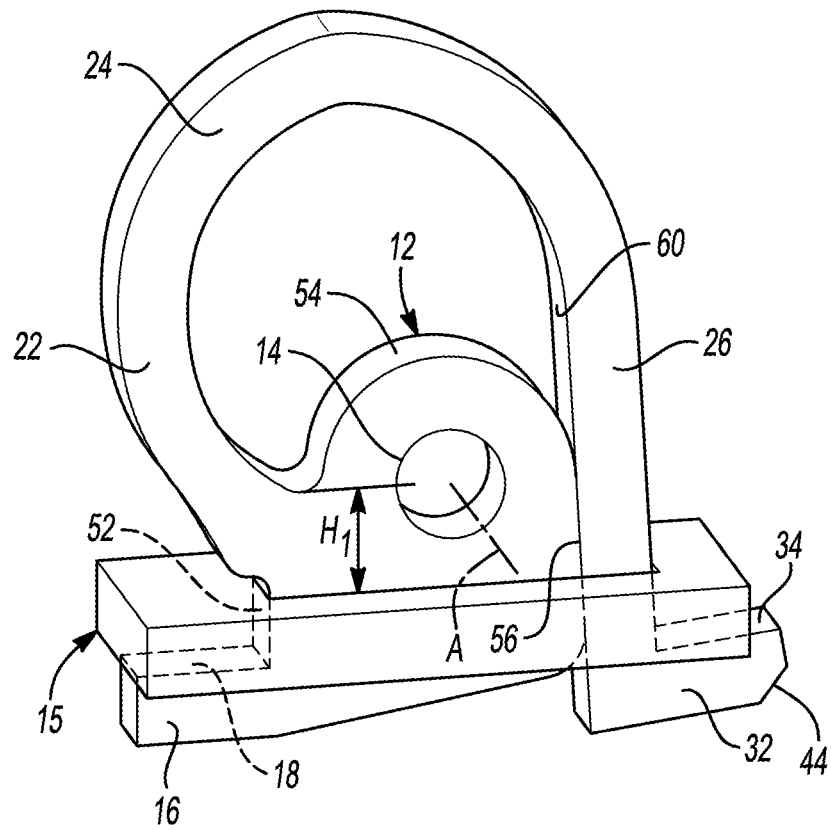
FIG. 3D is a perspective view of an exemplary fastener installed to the vehicle panel.

FIG. 3D illustrates the fastener in a secured or fixed position in the attachment aperture 20. When the fastener 10 is in the secured position, the body 12, first foot 16, and leg 22 may cooperate to form a waterproof joint. In one or more embodiments, the body 12, first foot 16, and leg 22 may be sized to engage the attachment aperture 20 in a press-fit manner to prevent water or other liquid from passing between a top surface of the panel and the bottom surface of the panel. To secure the fastener 10, the body 12 may be configured to sandwich the distal portion 26 of the leg 22 between the body 12 and the second edge 59 or wall defined by the attachment aperture 20.

In the secured position, the axis A of the aperture 14 defined by the body 12 may be spaced apart from a top surface 42 of the panel 15 by a predetermined distance or height Hi. The height Hi may be increased or decreased by rotating the body 12 in a clockwise or counter-clockwise direction.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A fastener comprising:
    a body defining an aperture that is sized to receive a vehicle actuation cable;
    a first foot extending from the body and including a locking surface configured to engage a surface adjacent to an attachment aperture;
    a cable engaging member, wherein the cable engaging member is an elongated tube that extends from the body along a center axis defined by the aperture; and
    a leg outwardly extending from the body, wherein a portion of the leg is curved around a portion of an outer periphery of the body so that a distal portion of the leg is biased away from the body.

2. The fastener of claim 1, wherein the cable engaging member and the body are integrally formed to one another.

3. The fastener of claim 1 wherein the body includes an upper portion that defines an outer periphery, and wherein the outer periphery of the upper portion is spaced apart from the curved portion of the leg.

4. The fastener of claim 1, wherein the distal portion of the leg is straight.

5. The fastener of claim 1, wherein leg terminates at a second foot and wherein the second foot defines a locking surface configured to engage a surface adjacent to the attachment aperture.

6. The fastener of claim 5, wherein a portion of the body and a portion of the leg defines a relief notch.

7. The fastener of claim 6, wherein the first foot and the second foot are arranged so that they extend away from one another.

8. The fastener of claim 5, wherein the second foot defines a chamfer configured to facilitate insertion of the second foot into the attachment aperture.

9. A clip configured to receive a vehicle actuation cable for fixing the vehicle actuation cable to a vehicle panel, the clip comprising:
    a body defining an aperture that is sized to receive an actuation cable;
    a first leg extending from the body and including a portion configured to engage a periphery of a connection aperture; and
    a second leg outwardly extending from the body, wherein a portion of the leg is curved around a portion of an outer periphery of the body so that a distal portion of the leg is biased away from the body.

10. The clip of claim 9, wherein a wall of the body engages the distal portion of the leg so that the distal portion of the second leg and a portion of the first leg each engage the periphery of the connection aperture.

11. The clip of claim 9, wherein the first leg terminates at a first foot provided with a locking surface configured to engage a surface adjacent to the connection aperture.

12. The clip of claim 9, wherein the second leg terminates at a second foot provided with a second locking surface configured to engage a second surface adjacent to the connection aperture.

13. The clip of claim 9, wherein the body includes a bottom surface, and wherein a portion of the body disposed between a wall and the bottom surface defines a radius configured to facilitate rotational movement of the body along the distal portion of the second leg.

14. A fastener for a vehicle actuation cable comprising:
    a body provided with an engagement wall and defining an aperture that is sized to receive an actuation cable;
    a first foot including a locking surface extends from the body, wherein a height between the aperture defined by the body and a top surface adjacent to the attachment aperture may change by rotating the body relative to the locking surface of the first foot; and
    a leg outwardly extending from the body, wherein a portion of the leg is curved around a portion of an outer periphery of the body so that a distal portion of the leg is biased away from the body and wherein the engagement wall is configured to engage the distal portion of the leg when the body is rotated towards the distal portion.

15. The fastener of claim 14, wherein the body defines a bottom surface and wherein the foot extends along an upward angle with respect to the bottom surface of the body.

16. The fastener of claim 14, further comprising an elongated tube outwardly extending from the body and wherein the elongated tube defines an inner periphery sized to receive the cable that is collinear to the aperture.

17. The fastener of claim 16, wherein the elongated tube is connected to the body by an intermediate portion and wherein the intermediate portion is tapered.

18. The fastener of claim 17, wherein the body, foot, leg, elongated tube, and intermediate portion are one piece formed by injection molding.

* * * * *